(12) United States Patent
Bromley et al.

(10) Patent No.: US 7,921,086 B1
(45) Date of Patent: Apr. 5, 2011

(54) DETERMINISTIC SPACE MANAGEMENT IN DEDUPLICATION APPLICATIONS

(75) Inventors: Graham Bromley, Dublin, CA (US); Yi Qu, Beijing (CN)

(73) Assignee: Symantec Corporation, Mountain View, CA (US)

( * ) Notice: Subject to any disclaimer, the term of this patent is extended or adjusted under 35 U.S.C. 154(b) by 345 days.

(21) Appl. No.: 12/343,334

(22) Filed: Dec. 23, 2008

(51) Int. Cl.
*G06F 7/00* (2006.01)
(52) U.S. Cl. ...................................... 707/692
(58) Field of Classification Search .................. 707/692
See application file for complete search history.

(56) References Cited

U.S. PATENT DOCUMENTS

| 2007/0050423 | A1* | 3/2007 | Whalen et al. | 707/200 |
| 2008/0098083 | A1* | 4/2008 | Shergill et al. | 709/217 |

* cited by examiner

*Primary Examiner* — Charles Rones
*Assistant Examiner* — Fazlul Quader
(74) *Attorney, Agent, or Firm* — Brill Law Office; Jeffrey Brill (57) ABSTRACT

Deterministic space management queries are answered in a deduplication context. A block subkey data structure comprises a subkey (a subset of the bits of a corresponding hash key identifying a block) and refcount (an indication of the total number of objects that reference a given block) for each block in a deduplication store. For each object, an object subkey data structure is maintained. An object subkey data structure comprises a list of subkeys corresponding to blocks referenced by that object. To answer a space management query concerning a given object set, a corresponding object set subkey data structure is created, comprising an entry for each block referenced by at least one object in the object set. Each entry comprises a subkey identifying that block and an object set refcount for that block. The data structures are utilized to efficiently answer space management queries.

21 Claims, 3 Drawing Sheets

DETERMINISTIC SPACE MANAGEMENT IN DEDUPLICATION APPLICATIONS

TECHNICAL FIELD

This invention pertains generally to storage management technology, and more specifically to deterministic space management in deduplication applications.

BACKGROUND

Data deduplication (also known by other names such as "single-instance storage", "capacity optimization" or "intelligent compression") refers to reducing storage requirements by eliminating storage of redundant data. Under deduplication, only one unique instance of a piece of content is actually retained on storage media, and multiple objects can point to the single unique instance. For example, a file system might contain 100 instances of the same one megabyte file. If the file system is backed up or archived without deduplication, all 100 instances are saved, requiring 100 megabytes to store the same one megabyte of content 100 times. With deduplication, only one instance of the file is actually stored, and that instance is referenced 100 times. Deduplication is thus a useful methodology for data storage management.

As useful is deduplication is, several aspects of this technology could use improvement. One such issue is the difficulty in determining how much space is wholly owned by a given object or set of objects. Suppose a set of objects $O_{[n]}$ (i.e., objects $O_1, O_2, \ldots O_n$) are written to a deduplication store (i.e., a storage application using deduplication). It would then be useful at some later time to determine how much space would be rendered freeable if object set $O_{[n]}$ were to be deleted. Without this information, space management of the deduplication store is very difficult. If the store approaches full capacity, the application can only react by deleting objects in sequence, observing how much space is actually freed as deletion proceeds. There is currently no deterministic way to predict how much space could be freed by deleting a particular set of objects.

A related issue involves the difficulty in determining the allocation cost of an object set (i.e., the storage effectively allocated to that object set). As with predicting how much space could be freed by deleting a particular set of objects, there is currently no deterministic way to determine the current allocation cost of an object set.

These two issues, the inability to effectively determine wholly-owned space and allocation cost for an object set, constitute a significant problem in current deduplication storage technology. It would be desirable to address these issues.

SUMMARY

Efficient deterministic space management is provided in a deduplication context. A block subkey data structure is maintained in computer memory. The block subkey data structure comprises an entry for each of a plurality of blocks in a deduplication store. Each entry comprises a subkey identifying that block and a refcount for that block. A subkey is a subset of bits of a corresponding full hash key identifying a block. A refcount indicates the number of objects that reference a given block, independent of the number of references to that block by any individual object.

For each of a plurality of objects in the deduplication store, a corresponding object subkey data structure is maintained. Each object subkey data structure comprises a list of subkeys corresponding to blocks referenced by that object. Object subkey data structures are stored in association with the corresponding objects.

To answer a query concerning how much space is wholly owned by a given object set or a query concerning how much space is allocated to a given object set, an object set subkey data structure is created concerning the object set of the query. An object set subkey data structure comprises an entry for each block referenced by at least one object in the object set. Each entry comprises a subkey identifying that block and an object set refcount for that block. The object set refcount indicates a number of objects in the object set that reference that block, independent of a number of references to that block by any individual object in the set. The data structures are utilized to efficiently answer space management queries.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
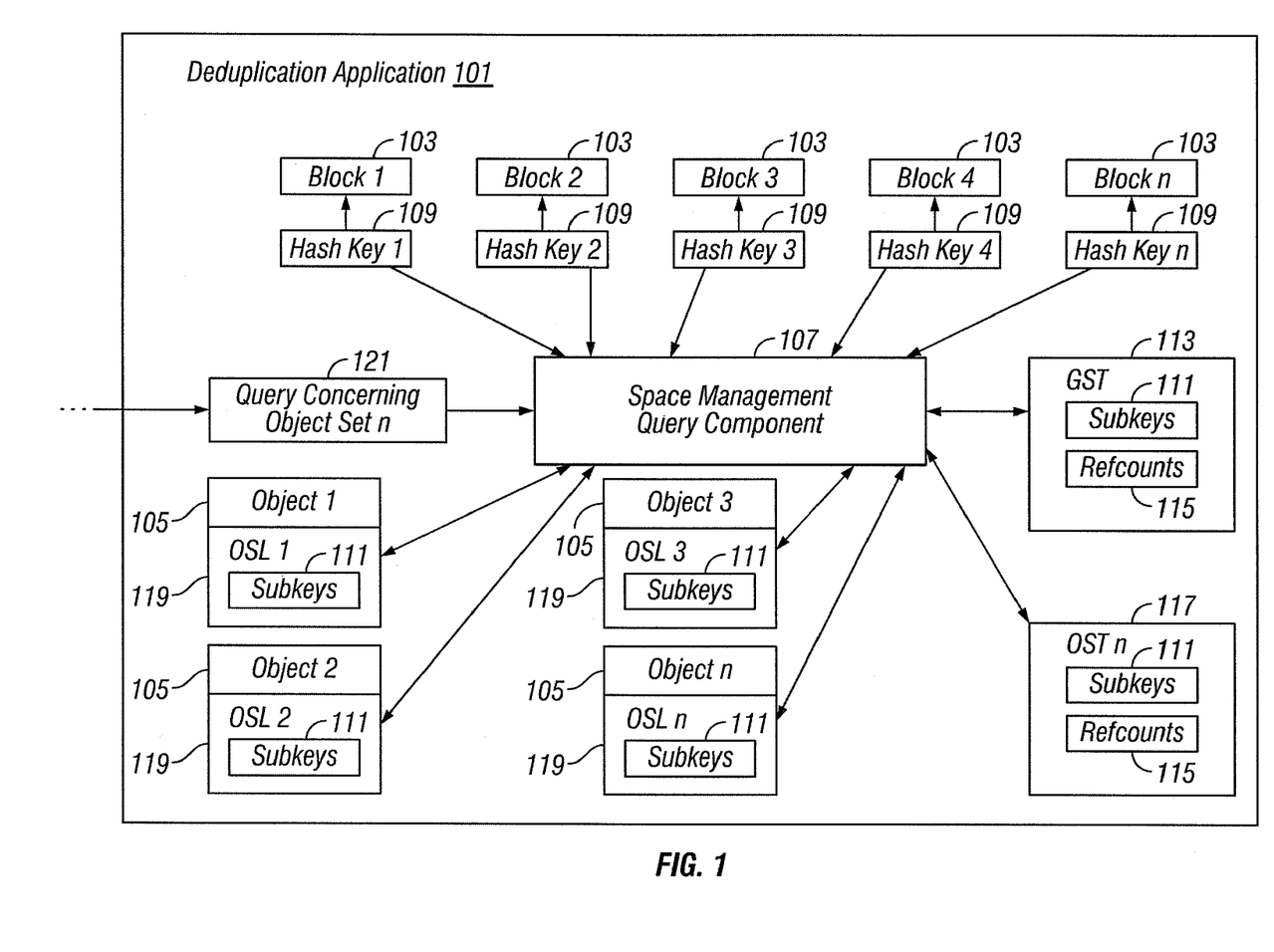
FIG. 1 is a block diagram illustrating a system for providing deterministic space management in a deduplication application, according to some embodiments of the present invention.

FIG. 1 illustrates a system for providing deterministic space management in a deduplication application 101, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As explained above, a particular block 103 in a deduplication store 101 can be referenced by any number of objects 105. The number of objects 105 that reference a particular block 103 changes dynamically, as new objects 105 are written to the deduplication store 101 and deleted from it. It is desirable to be able to determine wholly-owned space and allocation cost for an object 105 set reasonably efficiently. It is therefore implicit that in making such determinations, it would be desirable to utilize a minimum of disk activity and computation overhead. This in turn implies the benefit of maintaining sufficient metadata related to making such determinations, as blocks 103 and objects 105 are added to the deduplication store 101 and removed from it. This is so because if sufficient metadata exists, the underlying blocks 103 and objects 105 themselves do not need to be read when making such determinations. Further, it is desirable to maintain this metadata in memory rather than on disk where possible, to provide faster access.

It is to be understood that although space management queries 121 (i.e., what is the wholly-owned space or allocation cost for a particular object 105 set) should be answered reasonably efficiently, these queries 121 are not expected to occur with high frequency. In a typical use case, when free space in a deduplication store 101 reaches a high water mark, the deduplication application 101 would make appropriate space management queries 121, then delete enough objects 105 to remain clear of the high water mark for a reasonable period. As a result, the efficiency of space management queries 121 is to be balanced against cost of implementation, and in particular, should not impose a significant overhead on ongoing data insertion and deletion in the deduplication store 101, which can occur continuously with very high frequency.

Answers to space management queries 121 need not be exact. The possibility of continuous, frequent updates to the deduplication store 101 means that space management information is inherently dynamic. Therefore some degree of inaccuracy is acceptable (e.g., a few percent).

As illustrated in FIG. 1, a space management query component 107 determines wholly-owned space and allocation costs of object 105 sets in real time, with reasonable efficiency. It is to be understood that each block 103 in the deduplication store 101 is referenced by a hash key 109 of a given length, e.g., 16 bytes. However, to efficiently determine wholly-owned space and allocation costs, the space management query component 107 does not utilize the full hash key K 109 to identify a corresponding block 103, but instead a subkey S 111. A subkey 111 comprises a subset of the bits of a corresponding full hash key 109. Assuming the deduplication store 101 can hold a maximum of one billion blocks 103, a 40-bit subkey ill is sufficient to eliminate most alias collisions resulting from different K values having the same S value. In other words, using this relatively small subset 111 of a block's 103 full hash key 109 is adequate to identify the block 103 with sufficient uniqueness in a deduplication store 101 for the purpose of answering space management queries 121. This works because the number of blocks 103 in a deduplication store 101 is less by many orders of magnitude than the space addressed by a full hash key 109. By using a smaller subkey 111 to identity blocks 103, it is possible to maintain space management metadata entirely in memory, which enables the answering of space management queries 121 in real time. The specific number of bits of the full hash key 109 to use in the subkey 111 is a variable design parameter, depending upon, e.g., the maximum size of the deduplication store 101 and the level of accuracy required.

FIG. 1 illustrates specific data structures for organizing metadata in memory. It is to be understood that in other embodiments of the present invention, other data structures and metadata organization implementations are used. In the embodiment illustrated in FIG. 1, a global subkey table (GST) 113 is utilized. The GST 113 is a memory-resident table that contains subkeys 111 and refcounts 115 for the blocks 103 in the deduplication store 101, as described below. As noted above, the subkey 111 of a block 103 is the subset of the bits of a block's 103 full hash key 109. The refcount 115 of a block 103 indicates the number of objects 105 that reference that block 103, independent of the number of references to the block 103 by any individual object 105. Thus, if a block 103 is referenced multiple times by only one object 105, the refcount is 1, by definition. Each refcount R 115 is bounded by an upper limit MAXREF, which is determined by the number of bits comprising R. Thus, if the actual reference count of a block 103 is larger than MAXREF, refcount 115 for the block 103 will equal MAXREF. This approximation is adequate for space management queries 121 if MAXREF is large enough. The size of R also limits the number of objects 105 that can be specified in the object 105 set of a space management query 121. Approximately 16 bits is typically suitable for both wholly-owned space and allocation-cost queries 121, although the specific value to use for MAXREF is a variable design parameter.

The specific organization of the GST 113 is a variable design choice. A flat table with a subkey locator or a standard B-tree organization are two possible examples of specific intentions for a GST 113, but other data structures and storage implementations are also possible. In any case, because of the minimal data it stores, a GST 113 is relatively compact size. Because it is located in memory and organized to affect quick data manipulation, it is provides fast search, insert and delete times. Assuming a 40 bit subkey 111 and a 16 bit ref count 115, the minimum size of a GST entry is approximately 7 bytes, excluding organization overhead of the table, resulting in a table size of about 7 gigabytes for a store 101 of one billion blocks 103. If the full 16 byte hash keys 109 were used instead of the subkeys 111, the table would require 18 gigabytes.

The next data structure described is an object subkey table (OST) 117. An OST 117 is similar to the GST 113, but contains information for a specific set of objects O[n] 105 only. The space management query component 107 creates an OST 117 in memory for an object 105 set on demand, when the space management query component 107 is to determine the answer to a space management query 121 for that object 105 set. It is to be understood that an OST 117 need not be entirely memory-resident, but can be processed in memory section by section, to reduce memory usage, as desired.

An object subkey list (OSL) 119 is created for each object 105 in the deduplication store 101. As OSL 119 is a disk-resident data structure that contains a sorted list of all subkeys 111 for blocks 103 referenced by the corresponding object 105, with redundancies eliminated. An OSL 119 is stored in the deduplication store 101, either as part of the object 105 itself or in a known location separate from it.

When an object 105 is written to the deduplication store 101, the space management query component 107 determines hash key K 109, and from K subkey S 111, for each block 103 that the object 105 references. The space management query component 107 appends each subkey 111 to the corresponding OSL 119. When all of the subkeys ill for the object 105 have been written to the OSL 119, the space management query component 107 sorts the OSL 119 and eliminates redundant entries. The OSL 119 is stored in association with the object 105. The space management query component 107 proceeds to search the GST 113 for each subkey 111 in the OSL 119. If a given subkey 111 is found in the GST 113, the corresponding ref count 115 in the GST 113 is incremented (up to MAXREF). If the subkey is not found in the GST 113, a new entry for the subkey 111 is inserted into the GST 113, with the refcount 115 set to 1.

This process involves some disk activity to create the OSL 119, but this is only done once per object 105. Given a 5-byte subkey and a 64 kilobyte block 103 size for the deduplication store 101, an OSL 119 is only (5/64K) of the object 105 size. Assuming the object 105 is 95% redundant (only 5% new data), the OSL 119 represents about 5/3277 of the object's 105 new data, or about 0.15%. This is deemed to be an acceptable overhead.

When an object 105 is deleted from the deduplication store 101, the OSL 119 is read from disk (e.g., one section at a time). For subkey 111 in the OSL 119, the corresponding entries in the GST 113 are updated to reflect the deletion of the object 105. This involves decrementing the refcount 115, and if the decremented refcount 15 is equal to 0, removing the entry from the GST 113. If the refcount 115 is equal to MAXREF, the GST 113 refcount 115 is decremented only if the actual refcount 115 (as maintained by the deduplication store 101 for physical block 103 deallocation) drops below MAXREF.

As illustrated in FIG. 1, the space management query component 107 can determine how much space is wholly owned by an object 105 set O[n]. This allows the space management query component 107 to determine how much space would be rendered freeable, if the set of objects 105 specified by O[n] were to be deleted. To answer this query 121, an OST 117 for the object 105 set O[n] is created in memory, by reading the OSL 119 of each member of O[n], and summing refcount 115 values in the OST 117 entries. In principle, the entire OST 117 can be created before processing it. However, to reduce memory requirements, and because the OSLs 119 are sorted, the OST 117 can be processed one section at a time.

Determining the wholly-owned space of a set of objects 105 comprises determining how many blocks 103 in the deduplication store 101 are referenced only from objects 105 within the specified object 105 set. If particular block 103 is wholly-owned by the object 105 set, and the object 105 set is deleted, the block 103 is deemed to be rendered freeable. That is, it is now possible in principle to deallocate the block 103. This does not mean that the block 103 would necessarily be physically freed synchronously with deletion of the object 105 set; only that the block 103 would no longer be referenced by any extant object 105. The timing of physical block 103 deallocation is a function of the deduplication store 101 implementation, and is a separate issue from determining which blocks 103 are rendered freeable by deletion of given objects 105.

To process the OST 117, the refcount 115 in each non-zero OST 117 entry is compared to the corresponding GST 113 entry. For example, suppose that for object 105 set O[n], n equals 3, O[0] and O[2] both refer to subkey S 111, but O[1] does not. The OST 117 would have a refcount 115 for S equal to 2. If the GST 113 entry for S has a recount equal to 3, there is one reference to S from an object 105 not in object 105 set O[n]. On the other hand, if the GST 113 entry for S has a refcount equal to 2, all references to S in the deduplication store 101 would be encompassed by the object 105 set O[n], and hence the block 103 corresponding to S 103 would be wholly-owned by the object 105 set.

The only disk i/o involved in this computation is that utilized in order to instantiate the OST 117 in memory, which involves reading the OSL 119 for each member of O[n]. As an example, if n is 32, and each object 105 is approximately 128 gigabytes, for a block 103 size of 64 kilobytes, each OSL 119 would be two million blocks 103, or ten megabytes (for a 5-byte subkey). Thus the query 121 could be answered by reading 320 megabytes from disk. This is not trivial, however it is reasonable for such a large query 121, encompassing four terabytes of data. Space management queries 121 would not typically occur with high frequency, and execution time is to be balanced against memory requirements. It is not typically practical to maintain all OSLs 119 in memory. The above the example provides is a very large improvement over scanning the entire store 101 to determine associations between objects 105 and blocks 103.

As illustrated in FIG. 1, the space management query component 107 can also determine how much space is allocated to a set of objects 105 specified by O[n], with an equal-share (or weighted) allocation per refcount 115 per block 103. For example, if a block 103 is referenced by six objects 105, including object 105 O[x], then ⅙ (or ⅙ times a weighting factor) of the block 103 would be allocated to object 105 O[x], for costing purposes. In other words, the allocation cost of an object 105 comprises the sum of 1/refcount 115 per block 103, for all blocks 103 referenced by the object 105.

To determine how much space is allocated to a set of objects 105 specified by O[n], the OST 117 for O[n] is instantiated in memory, as described above. The OST 117 is scanned from beginning to end, and for each non-zero entry, the value of the refcount 115 of the OST 117 over the refcount 115 of the GST 113 (OST.refcount/GST.refcount) is added to the allocation cost of the set of objects 105. If the actual refcount 115 of a block 103 is larger than MAXREF, the allocation cost to an object 105 that references the block 103 is deemed to be 1/MAXREF. As with wholly-owned-space queries 121, the OST 117 can but need not be processed section by section, to avoid storing the entire OST 117 in memory at one time.

Subkey 111 aliasing should be rare, but can occur in principle. If two blocks 103 with different hash keys 109 H1 and H2 but identical subkeys 111 S were referenced by only two objects 105, the GST 113 entry for S would have a value of two. Thus, a wholly-owned-space query 121 for one of the objects 105, as described above, would not indicate that block S 103 would be rendered freeable responsive to deleting one of the objects 105. In fact, deletion of either object 105 should result in a block 103 being rendered freeable (because the two objects 105 actually reference two different blocks 103, each with a true refcount 115 of 1). Thus, the answer returned by a wholly-owned-space query 121 is pessimistic. In other words, at least as much space as the returned value is wholly owned by the set of objects 105, but not less.

In the case of allocation costing, the query 121 answer is optimistic. Given the collision example above, each of the two objects 105 would be allocated a cost of one half of the block 103. In fact, each object 105 should be charged the full value of one block 103, as each object 105 references a different block 103, each with a true reference count of one. Thus, the returned allocation cost is a minimum value.

Figure 2:
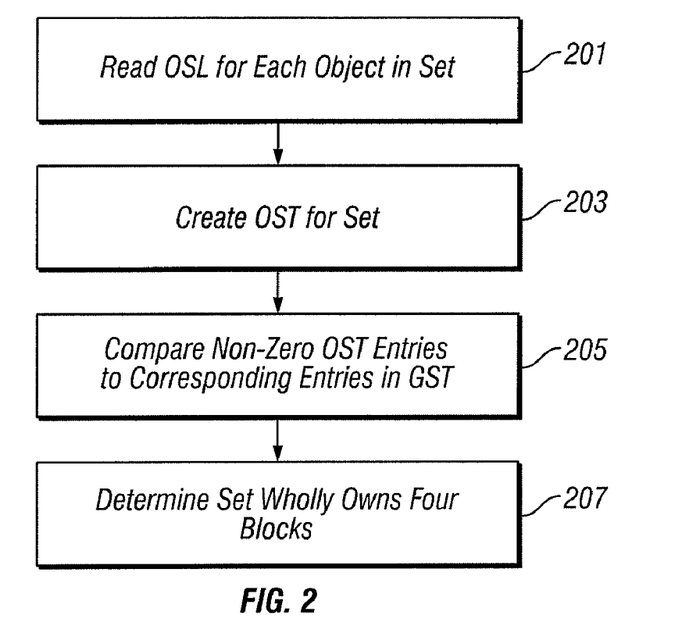
FIG. 2 is a flowchart illustrating steps for determining the space that would be rendered freeable by deleting a specific set of objects, according to one embodiment of the present invention.
Figure 3:
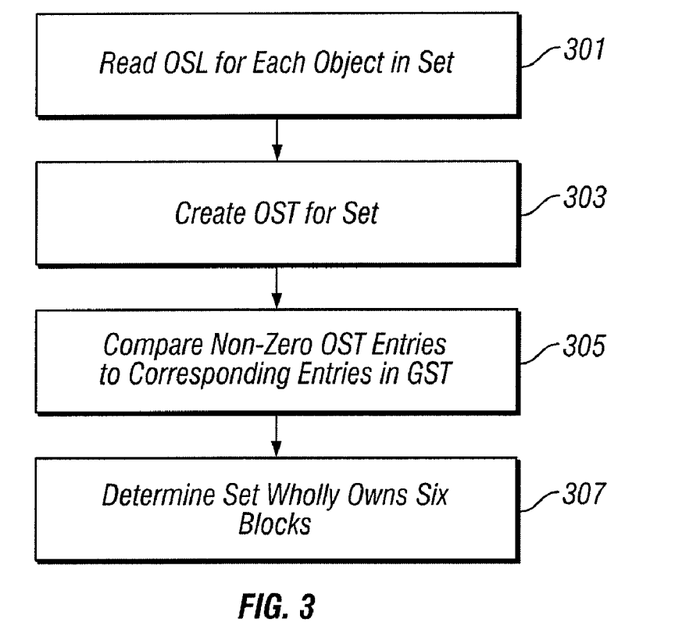
FIG. 3 is a flowchart illustrating steps for determining the space that would be rendered freeable by deleting a different set of objects, according to one embodiment of the present invention.
Figure 4:
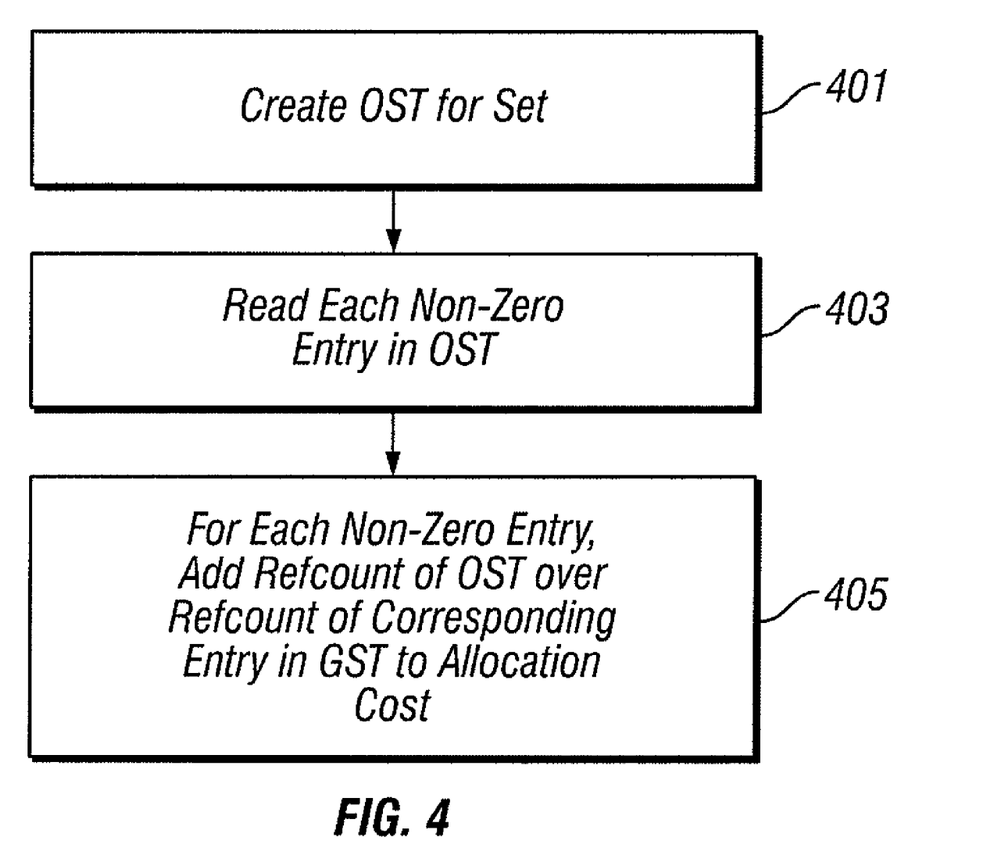
FIG. 4 is a flowchart illustrating steps for determining the allocation cost of a specific set of objects, according to one embodiment of the present invention.

FIG. 2 illustrates steps for determining the space that would, be rendered freeable by deleting a specific set of objects 105 (FIG. 1), according to one embodiment of the present invention. FIG. 3 illustrates steps for determining the space that would be rendered freeable by deleting a different set of objects 105 (FIG. 1), according to one embodiment of the present invention. FIG. 4 illustrates steps for determining the allocation cost of a specific set of objects 105 (FIG. 1), according to one embodiment of the present invention.

TABLE 1

(OSLs)

| O1 | O2 | O3 | O4 |
|----|----|----|----|
| S2 | S3 | S1 | S1 |
| S5 | S5 | S2 | S7 |
| S7 | S7 | S7 |    |
|    | S8 | S9 |    |

TABLE 2

(GST)

S1 = 2
S2 = 2
S3 = 7
S5 = 2
S7 = 4
S8 = 1
S9 = 1

FIGS. 2-4 refer to a scenario with objects 105 O1, O2, O3 and O4. The contents of the OSLs 119 (FIG. 1) corresponding to the four objects 105 (FIG. 1) is represented by Table 1, and the contents of the GST 113 (FIG. 1) by Table 2. In both of these tables, specific subkeys 111 (FIG. 1) are identified by the notation SX, with X being a given number.

As illustrated in FIG. 2, to determine the amount of space that would be rendered freeable by deleting the objects 105 (FIG. 1) in a set consisting of O1, O2 and O3, the OSL 115 (FIG. 1) for each object in the set is read 201, and an OST 117 (FIG. 1) corresponding to the set is created 203. This OST 117 (FIG. 1) contains the following data: S1=1 (O3), S2=2 (O1+O3), S3=1 (O2), S5=2 (O1+O2), S7=3 (O1+O2+O3), S8=1 (O2) and S9=1 (O3). The refcount 115 (FIG. 1) in each non-zero entry of the OST 117 (FIG. 1) is compared 205 to the corresponding entry of the GST 113 (FIG. 1). The comparing step in the example illustrated in FIG. 2 indicates that the blocks 103 (FIG. 1) referenced by subkeys S2, S5, S8 and S9 are wholly owned by the set of objects (103) consisting of O1, and O3. Thus, it is determined 207 that the set contains four wholly owned blocks 103 (FIG. 1).

FIG. 3 illustrates an example in which a set also contains object O4 (i.e., the set of objects 105 (FIG. 1) consists of O1, O2, O3 and O4). In this example, reading 301 the OSL 115 (FIG. 1) for each object 105 (FIG. 1) and creating 303 a corresponding OST 117 (FIG. 1) for the set results in an OST 117 (FIG. 1) with the following data: S1=2 (O3+O4), S2=2 (O1+O3), S3=1 (O2), S5=2 (O1+O2), S7=4 (O1+O2+O3+O4), S8=1 (O2) and S9=1 (O3). Comparing 305 these OST 117 (FIG. 1) entries to the corresponding entries of the GST 113 (FIG. 1) results in the determination 307 that the set of objects 105 (FIG. 1) consisting of O1, O2, O3 and O4 contains six wholly owned blocks 103 (FIG. 1). These are the blocks 103 (FIG. 1) referenced by subkeys S1, S2, S5, S7, S8 and S9.

FIG. 4 illustrates calculating the allocation cost of a set of objects 105 (FIG. 1) consisting of the single object O1. An OST 117 (FIG. 1) for the set is created 401, and each non-zero entity (in this case S2, S5 and S7) therein is read 403. The allocation cost is calculated 405 as the sum of the non-zero refcounts 115 (FIG. 1) of the OST 117 (FIG. 1) over the corresponding refcounts 115 (FIG. 1) of the GST 113 (FIG. 1). In this case that equals ½ (S2)+½ (S5)+¼ (S7) 1.25 blocks 103 (FIG. 1).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies, data structures and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable storage media as computer program products. Any form of tangible computer readable storage medium can be used in this context, such as magnetic or optical storage media. As used herein, the term "computer readable storage medium" does not mean an electrical signal separate from an underlying physical medium. Additionally, software portions of the present invention can be instantiated (for example as object code or executable images) within the memory of any computing device. Accordingly, the disclosure of the present invention is intended to be illustrative, but not limiting, of the scope of the invention, which is set forth in the following claims.

What is claimed is:

1. A method for providing deterministic space management in a deduplication context, the method comprising the steps of:

maintaining, by a computer, a block subkey data structure in computer memory, the block subkey data structure comprising an entry for each of a plurality of blocks in a deduplication store, each entry comprising a subkey identifying that block and a refcount for that block, each subkey comprising a subset of bits of a corresponding full hash key identifying that block, and each refcount indicating a number of objects that reference that block, independent of a number of references to that block by any individual object;

for each of a plurality of objects in the deduplication store, maintaining, by a computer, a corresponding object subkey data structure, each object subkey data structure comprising an identifying subkey for each block referenced by the corresponding object, and being stored in association with that object;

receiving, by a computer, a space management query concerning a specific object set;

responsive to the received query, creating, by a computer, an object set subkey data structure concerning the object set, the object set subkey data structure comprising an entry for each block referenced by at least one object in the object set, each entry comprising a subkey identifying that block and an object set refcount for that block, the object set refcount indicating a number of objects in the object set that reference that block, independent of a number of references to that block by any individual object in the set; and utilizing the object set subkey data structure to determine an answer to the received space management query, by a computer.

2. The method of claim 1 wherein the received space management query further comprises a query as to how much space is wholly owned by the object set, the method further comprising:

for each entry in the object set subkey data structure for which the refcount is not equal to zero, comparing, by a computer, that entry to an entry in the block subkey data structure concerning the same subkey;

for each entry in the object set subkey data structure for which the refcount is equal to the refcount in the corresponding entry in the block subkey data structure, determining, by a computer, that the block referenced by that subkey is wholly owned by the object set; and determining, by a computer, that the amount of space wholly owned by the object set is equal to an amount of space consisting of all blocks determined to be wholly owned by the object set.

3. The method of claim 1 wherein the received space management query further comprises a query as to how much space is allocated to the object set, the method further comprising:

for each entry in the object set subkey data structure for which the refcount is not equal to zero, dividing, by a computer, the refcount of the object set subkey data structure by the refcount of a corresponding entry in the block subkey data structure; and adding, by a computer, the resulting quotient to an allocation cost for the object set.

4. The method of claim 3 further comprising:
adjusting, by a computer, the allocation cost for the object set by a weighting factor.

5. The method of claim 1 further comprising:
writing a new object to the deduplication store, by a computer.

6. The method of claim 5 wherein writing a new object to the deduplication store further comprises:

determining a full hash key for each block that the object references, by a computer;

for each full hash key, creating a corresponding subkey from that full hash key, by a computer;

adding each created subkey to an object subkey data structure concerning the object, by a computer;

eliminating any redundant entries from the object subkey data structure, by a computer;

storing the object subkey data structure in association with the object, by a computer;

searching the block subkey data structure for each subkey in the object subkey data structure, by a computer;

responsive to locating a given subkey in the block subkey data structure, incrementing the refcount in the corresponding entry in the block subkey data structure, by a computer; and responsive to not locating a given subkey in the block subkey data structure, creating a new entry for that subkey in the in the block subkey data structure, and setting the refcount of that entry to one, by a computer.

7. The method of claim 1 further comprising:
deleting an object from the deduplication store, by a computer.

8. The method of claim 7 wherein deleting an object to the deduplication store further comprises:

searching the block subkey data structure for each subkey in the object subkey data structure concerning the object, by a computer;

decrementing the refcount in the corresponding entry in the block subkey data structure, by a computer; and responsive to a decremented refcount being equal to zero, removing that entry from the block subkey data structure, by a computer.

9. The method of claim 1 further comprising:
bounding, by a computer, each refcount by an upper limit.

10. At least one computer readable storage medium containing a computer program product for providing deterministic space management in a deduplication context, the computer program product comprising:

program code for maintaining a block subkey data structure in computer memory, the block subkey data structure comprising an entry for each of a plurality of blocks in a deduplication store, each entry comprising a subkey identifying that block and a refcount for that block, each subkey comprising a subset of bits of a corresponding full hash key identifying that block, and each refcount indicating a number of objects that reference that block, independent of a number of references to that block by any individual object;

program code for maintaining, for each of a plurality of objects in the deduplication store, a corresponding object subkey data structure, each object subkey data structure comprising an identifying subkey for each block referenced by the corresponding object, and being stored in association with that object;

program code for receiving a space management query concerning a specific object set;

program code for, responsive to the received query, creating an object set subkey data structure concerning the object set, the object set subkey data structure comprising an entry for each block referenced by at least one object in the object set, each entry comprising a subkey identifying that block and an object set refcount for that block, the object set refcount indicating a number of objects in the object set that reference that block, independent of a number of references to that block by any individual object in the set; and program code for utilizing the object set subkey data structure to determine an answer to the received space management query.

11. The computer program product of claim 10 wherein the program code for receiving a space management query further comprises program code for receiving a query as to how much space is wholly owned by the object set, the computer program product further comprising:

program code for comparing each entry in the object set subkey data structure for which the refcount is not equal to zero to an entry in the block subkey data structure concerning the same subkey;

program code for determining that, for each entry in the object set subkey data structure for which the refcount is equal to the refcount in the corresponding entry in the block subkey data structure, the block referenced by that subkey is wholly owned by the object set; and program code for determining that the amount of space wholly owned by the object set is equal to an amount of space consisting of all blocks determined to be wholly owned by the object set.

12. The computer program product of claim 10 wherein the program code for receiving a space management query further comprises program code for receiving a query as to how much space is allocated to the object set, the computer program product further comprising:
program code for dividing the refcount of an object set subkey data structure by the refcount of a corresponding entry in the block subkey data structure, for each entry in the object set subkey data structure for which the refcount is not equal to zero; and
program code for adding each resulting quotient to an allocation cost for the object set.

13. The computer program product of claim 12 further comprising:
program code for adjusting the allocation cost for the object set by a weighting factor.

14. The computer program product of claim 10 further comprising:
program code for writing a new object to the deduplication store.

15. The computer program product of claim 14 wherein the program code for writing a new object to the deduplication store further comprises:
program code for determining a full hash key for each block that the object references;
program code for creating, for each full hash key, a corresponding subkey from that full hash key;
program code for adding each created subkey to an object subkey data structure concerning the object;
program code for eliminating any redundant entries from the object subkey data structure;
program code for storing the object subkey data structure in association with the object;
program code for searching the block subkey data structure for each subkey in the object subkey data structure;
program code for, responsive to locating a given subkey in the block subkey data structure, incrementing the ref count in the corresponding entry in the block subkey data structure; and
program code for, responsive to not locating a given subkey in the block subkey data structure, creating a new entry for that subkey in the in the block subkey data structure, and setting the refcount of that entry to one.

16. The computer program product of claim 10 further comprising:
program code for deleting an object from the deduplication store.

17. The computer program product of claim 16 wherein the program code for deleting an object to the deduplication store further comprises:
program code for searching the block subkey data structure for each subkey in the object subkey data structure concerning the object;
program code for decrementing the refcount in the corresponding entry in the block subkey data structure; and
program code for, responsive to a decremented refcount being equal to zero, removing that entry from the block subkey data structure.

18. The computer program product of claim 10 further comprising:
program code for bounding each refcount by an upper limit.

19. A computer system for providing deterministic space management in a deduplication context, the computer system comprising:
means for maintaining a block subkey data structure in computer memory, the block subkey data structure comprising an entry for each of a plurality of blocks in a deduplication store, each entry comprising a subkey identifying that block and a refcount for that block, each subkey comprising a subset of bits of a corresponding full hash key identifying that block, and each refcount indicating a number of objects that reference that block, independent of a number of references to that block by any individual object;
means for maintaining, for each of a plurality of objects in the deduplication store, a corresponding object subkey data structure, each object subkey data structure comprising an identifying subkey for each block referenced by the corresponding object, and being stored in association with that object;
means for receiving space management queries concerning specific object sets;
means for, responsive to the received query, creating an object set subkey data structure concerning the object set, the object set subkey data structure comprising an entry for each block referenced by at least one object in the object set, each entry comprising a subkey identifying that block and an object set refcount for that block, the object set refcount indicating a number of objects in the object set that reference that block, independent of a number of references to that block by any individual object in the set; and
means for utilizing the object set subkey data structure to determine an answer to the received space management query.

20. The computer system of claim 19 wherein the means for receiving space management queries further comprise means for receiving queries concerning how much space is wholly owned by the object set and means for receiving queries concerning how much space is allocated to the object set, the computer system further comprising:
means for comparing each entry in the object set subkey data structure for which the refcount is not equal to zero to an entry in the block subkey data structure concerning the same subkey;
means for determining that, for each entry in the object set subkey data structure for which the refcount is equal to the refcount in the corresponding entry in the block subkey data structure, the block referenced by that subkey is wholly owned by the object set;
means for determining that the amount of space wholly owned by the object set is equal to an amount of space consisting of all blocks determined to be wholly owned by the object set;
means for dividing the refcount of an object set subkey data structure by the refcount of a corresponding entry in the block subkey data structure, for each entry in the object set subkey data structure for which the refcount is not equal to zero; and
means for adding each resulting quotient to an allocation cost for the object set.

21. A method for answering deterministic space management queries in a deduplication context, the method comprising the steps of:
identifying blocks in a deduplication store by subsets of bits of corresponding full hash keys, by a computer;
tracking numbers of objects that reference individual blocks in the deduplication store, by a computer;
using subsets of bits identifying blocks to identify those blocks referenced by individual objects in the deduplication store, by a computer;
receiving a space management query concerning a specific object set, by a computer;
wherein receiving the space management query concerning a specific object set further comprises performing a step from a group of steps consisting of: 1) receiving a query as to how much space is wholly owned by the object set, by a computer, and 2) receiving a query as to how much space is allocated to the object set, by a computer; and using subsets of bits identifying blocks referenced by the object set and tracked numbers of objects that reference those blocks to determine an answer to the received space management query, by a computer;

wherein using subsets of bits identifying blocks referenced by the object set and tracked numbers of objects that reference those blocks to determine the answer to the received space management query further comprises performing a step from a group of steps consisting of: 1) using subsets of bits identifying blocks referenced by the object set and tracked numbers of objects that reference those blocks to determine how much space is wholly owned by the object set, by a computer, and 2) using subsets of bits identifying blocks referenced by the object set and tracked numbers of objects that reference those blocks to determine how much space is allocated to the object set, by a computer.

* * * * *

UNITED STATES PATENT AND TRADEMARK OFFICE
CERTIFICATE OF CORRECTION

PATENT NO. : 7,921,086 B1
APPLICATION NO. : 12/343334
DATED : April 5, 2011
INVENTOR(S) : Graham Bromley and Yi Qu It is certified that error appears in the above-identified patent and that said Letters Patent is hereby corrected as shown below:

In the Specifications:
Col. 4, line 30, replace "data manipulation, it is provides fast search, insert and delete" with "data manipulation, it provides fast search, insert and delete"

Col. 6, line 7, replace "practical to maintain all OSLs 119 in memory. The above the" with "practical to maintain all OSLs 119 in memory. The above"

In the Claims:
Col. 11, line 35, claim 15, replace "the block subkey data structure, incrementing the ref" with "the block subkey data structure, incrementing the ref-"

Signed and Sealed this
Seventeenth Day of May, 2011

David J. Kappos
*Director of the United States Patent and Trademark Office*